United States Patent Office 3,397,066
Patented Aug. 13, 1968

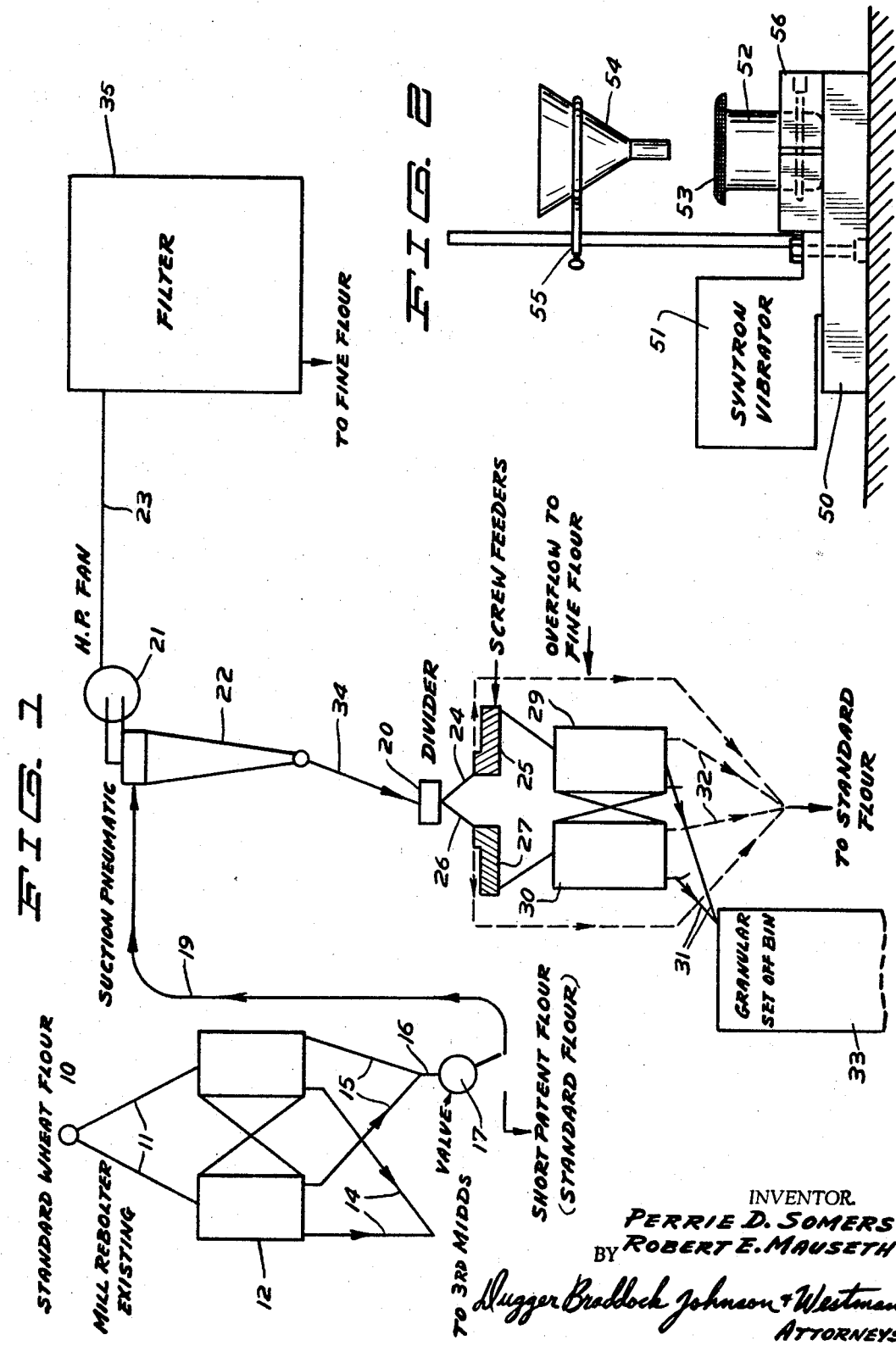

3,397,066
PROCESS FOR PREPARING A FLOWABLE FLOUR AND PRODUCT FORMED BY SAID PROCESS
Perrie D. Somers, Jr., and Robert E. Mauseth, Minneapolis, Minn., assignors to International Milling Company, Inc., Minneapolis, Minn., a corporation of New York
Filed June 5, 1964, Ser. No. 372,864
6 Claims. (Cl. 99—93)

ABSTRACT OF THE DISCLOSURE

Preparation of a non-agglomerated free flowing easily wettable flour from a parent flour by classifying parent flour into a granular portion containing 10–50% of the parent flour and a fine portion containing 90–50% by sifting on a screen or sieve having openings in the range of 86 microns to 130 microns whereby the "overs" constitute the granular portion having a wettability index of less than 90 seconds and a flowability index of less than 60 seconds.

---

The present invention relates to a process of producing a granular flour that is free flowing, is rapidly wettable, is relatively dust free, and has the bulk density required by home baking recipes, and the product produced by said process.

In recent years there has been a trend toward making the handling of flour easier and more convenient for the homemaker. One step in this direction was the introduction of the pre-sifted concept which eliminated the need of sifting the flour in the home.

Another step was the application of the concepts of the agglomeration of powders such as skim milk to flour to provide a flour that is coarse, granular, more flowable and more easily wettable than flours available prior to the agglomerated flours. With respect to making flour flow more freely and more wettable, agglomeration processes have the following disadvantages:

(1) They are relatively costly operations that increase the total production cost of the stable food, flour, by about 10–20%.

(2) They alter the overall baking quality of the flour and render it less acceptable for many products, and (3) It is not possible to use a final sifting step to remove insect eggs and larvae because of the friability of the agglomerated product and its coarseness.

The present invention is directed to the discovery that there is present in normal (conventional non-agglomerated) flour (sometimes referred to hereinafter as "parent" flour), a portion that can be removed by conventional equipment (sifting, air classifying equipment etc.) that has the desirable characteristics of bulk density, flowability and wettability, and is relatively dust-free. This flour portion of our invention is substantially equal to the parent flour in baking performance, in ash content, in protein content, and other quality characteristics that are used to judge flour. Further, the portion that remains after the portion of our invention has been removed also has substantially the same baking performance and other quality characteristics that the original or parent flour possessed. Additionally, the process of this invention for making a free flowing flour has all the advantages of a flour produced by an agglomeration process and has none of its disadvantages.

The new flour of this invention which is described herein and hereinafter referred to as "granular flour" flows freely, is rapidly wettable, is relatively dust free, and has excellent baking performance. Production plant installations for carrying out this invention are much less costly than those for the agglomeration of flour since only conventional milling equipment need be used. Since the flour of this invention is readily prepared directly from a standard (conventional non-agglomerated) flour, it meets all the definitions and standards of identity that have previously been prescribed for such flour. Agglomerated flours do not meet the present standards of identity; although, there is presently being considered by the FDA of the Department of Health, Education and Welfare an amendment to the regulations fixing and establishing a definition and standard of identity for flour. The above mentioned findings were completely unexpected to those skilled in the art of flour making.

One of the objects of this invention is to provide a new and novel method for preparing a free flowing, rapidly wettable flour that has substantially the same baking characteristics of flour prepared by conventional processes. Another object of this invention is to provide a new and novel method of preparing a free flowing, rapidly wettable wheat flour utilizing conventional milling equipment. Still another object of this invention is to provide a process to produce a low cost, free flowing, non dusting, easily wettable wheat flour of standard bulk density which has good baking quality and can be adequately protected from infestation. A still further object of this invention is to separate a new and novel portion from standard wheat flour by sifter action to provide a free flowing, wettable flour. An additional object of this invention is to provide a new and novel flour product by utilizing the process of the above objectives.

Other and further objects are those inherent in the invention herein illustrated, described, and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the invention may be employed.

In order to facilitate an understanding of the invention, the terminology "granular flour" used hereinafter in the specification and claims refers to a flour that is free flowing and easily wettable, but which has not been agglomerated by a manufacturing process to intentionally cause numbers of individual flour particles to adhere together in aggregates that are substantially larger than the average individual flour particle. As to the term "non-agglomerated," this term is not meant to exclude flour which contains naturally agglomerated particles as distinguished from flour which has been processed to intentionally cause agglomeration of said particles as exemplified by many patents directed to processes for agglomerating flour.

FIG. 1 diagrammatically illustrates a typical mill flow for producting the granular flour of this invention; and FIG. 2 illustrates the apparatus set up for measuring wettability.

In the processing of conventional (non-agglomerated) flour, the wheat after passing through a series of conventional milling steps is delivered at 10 to pass along the flow path 11 to the mill rebolter 12. The "overs" at the mill rebolter pass along flow streams 14 to the third middlings while the "thrus" pass along flow stream 15 to the outlet 16. Normally the flour at stream or outlet 16 is packaged or stored prior to be used or sold as conventional (non-agglomerated) flour. The flour of stream 16 is generally referred to as "a patent flour." The actual series of steps to produce the aforementioned patent flour may be by any one of a variety of known procedures involving roller or impact grinding and a variety of known sifting procedures.

In accordance with the process of this invention, one method of producing a granular flour is to have all or a portion of the flour at outlet 16 passed through valve 17 and drawn by a suction pneumatic conveyor to the divider 20. That is a suction fan 21 opens to the top of the cyclone chamber 22 to draw the standard flour from valve 17 through the conduit 19 to the top of the cyclone chamber. At the cyclone chamber the air and extreme fines pass through the suction blower 21, line 23 and into the filter 35. Substantially all of the flour passing through line 19 drops to the bottom of the chamber 22 and thence passes through line 34 to the divider 20. The divider diverts part of the flour to pass through line 24 to the screw feeder 25 and another part through line 26 to a second feeder 27. The screw feeders 25, 27 serve to spread the respective streams of flour over the length of the sifting boxes 29 and 30 respectively. The sifting boxes are clothed with screens or cloths that are finer than those used in the mill rebolter. The "fines" portion which pass through the sifting box cloths as indicated by the streams 32 (fine flour) is handled as standard flour in a manner similar to that which is normally taken at outlet 16. The "overs" portion at the sifting boxes 29, 30 is indicated by streams 31, which is the "granular flour" of this invention. This granular flour is passed to the granular set off bin 33 for storage or other conventional treatment of standard flour prior to being sold for use in the manufacture of bakery goods or for other conventional uses of flour. More explicitly the granular flour of streams 31 is ready for bleaching and enriching treatment before being packaged and/or sold; or if it is to be used as a self rising flour then the self rising ingredients are also added at this time.

Where sifting is utilized to separate a flour coming within the present or proposed government standards of identity into a "granular flour" and a "fine flour" in accordance with this invention, the sifter frame is desirably clothed with a cloth or sieve selected from a group having openings that range in size from 86 microns to 130 microns, and preferably one selected from a group having openings in the range of 83 microns to 93 microns. However as will be more apparent from the examples, the classification of this invention may be accomplished in a number of other ways, for example, air classification, or a conventional gyro-sifter can be clothed with a sifting cloth having openings in the size range of the above mentioned cloths or screens.

The amount of granular flour obtained by classifying flour in accordance with this invention is about 10% to 50% of the parent wheat flour. For example if the parent flour is a short patent wheat flour and it is being classified by sifting with a cloth having size openings in the range of openings of the cloths referred to in the preceding paragraph, the sifting operation is continued until only 10% to 50% of parent flour remains as "overs" to provide the granular flour of this invention and the remaining portion, the "thrus," constitutes the "fine flour." The fine flour portion and the granular flour portion each have substantially the same baking performance and quality characteristics that the parent flour possessed. Also as may be noted from one of the examples, the granular flour of this invention may be separated from other than a short patent flour.

Preferably the granular portion has the following chemical and physical analysis as follows:

| | Spring Wheat Granular | Winter Wheat Granular |
|---|---|---|
| Moisture, Percent | 14.2±0.5 | 13.5±0.5 |
| Ash (14% Mt. Basis), Percent | .39±0.2 | .39±.02 |
| Protein, Percent | 12.1±0.2 | 9.7±.02 |
| Wettability Index (maximum), sec | 40 | |
| Flowability Index (maximum), sec | 20 | |
| Granulation Range | (*) | (*) |
| Cup Weight, gms | 125±7 | |

*Over 100 U.S. Standard Sieve, 0 to trace. Thru 200 U.S. Standard Sieve, 10% maximum.

Although the moisture, ash and protein content largely depends on the particular wheat that is being milled.

With reference to the above Granulation Range, if the FDA changes the regulations fixing and establishing a definition and standard of identity for flour to passing through a cloth having openings not larger than those of woven wire cloth designated as "210 micron (No. 70)" then "Over 70 U.S. Standard Sieve, 0 to trace" is to be substituted for "Over 100 U.S. Standard Sieve, 0 to trace."

In any event preferably the classification provides a granular flour having a Wettability Index of less than 40 seconds, Flowability Index of less than 20 seconds, a dust content (percent through 200 U.S. Standard Sieve) of less than 10% of the granular fraction, and a cup weight of less than 132 grams. However acceptable characteristics in order to be considered a granular flour are about as follows:

Wettability Index of less than 90 seconds,
Flowability Index of less than 60 seconds,
Dust Content less than 17% and cup weight less than 145 grams.

In comparing the data given and the basic examples set forth hereinafter, certain standard statistical techniques were used. Standard deviations for the tests were estimated using the following formula:

$$S^2 = \frac{\sum_{i=1}^{i=n}(X_i-\overline{X})^2}{n-1}$$

where S is the estimated standard deviation, n is the sample number, $X_i$ is an individual observation, and $\overline{X}$ is the average of all the observations.

Least significant difference (LSD) values for the 95% confidence level were calculated using the formula:

$$LSD = \frac{S \times 2\sqrt{2}}{\sqrt{n}}$$

where S is the estimate of standard deviation and n is the number of replications performed to give the results that are being compared. In all the examples listed n is taken to be one.

Table I lists the estimates of standard deviations and the least significant differences for the various tests used.

| Test | Standard Deviation | LSD |
|---|---|---|
| Ash (percent) | .01 | .03 |
| Protein (percent) | .1 | .3 |
| Cake Volume (cc.) | 75 | 210 |
| Bread Volume (cc.) | 75 | 210 |
| Biscuit Specific Volume (cc./gm.) | .07 | .20 |
| Wettability Index (seconds) | 3.5 | 10 |
| Cup Weight (gms.) | 2 | 6 |
| Flowability Index | | |

The ash determination and the protein determination are described in Cereal Laboratory Methods, 7th ed., compiled by the American Association of Cereal Chemists. The baking methods are conventional, while the cup weight, the Wettability Index, the Flowability Index and the granulation (sifting) tests are set forth hereinafter.

Several agglomerated flours are presently being marketed in the United States. In order to give a comparison of the granular flour of this invention with agglomerated flour, a typical analysis of a sample of the flour sold under the tradename Wondra is listed below in Table I.

TABLE I

| | |
|---|---|
| Ash (percent) | .40 |
| Protein (percent) | 10.4 |
| Bread volume (cc.) | 2365 |
| Cake volume (cc.) | 2300 |
| Cup weight (gms.) | 124 |
| Flowability Index (seconds) | 12 |
| Wettability Index (seconds) | 28 |
| Granulation: | |
| Over U.S. Standard Sieve #100 | 39.0 |
| Over U.S. Standard Sieve #120 | 23.6 |
| Over U.S. Standard Sieve #140 | 17.8 |
| Over U.S. Standard Sieve #170 | 4.7 |
| Over U.S. Standard Sieve #200 | 9.2 |
| Through U.S. Standard Sieve #200 | 4.7 |

To illustrate the invention the following examples are given.

EXAMPLE 1

The parent flour referred to in Table II was a spring wheat short patent flour made at the rate of 100 cwt./hr. Normally this parent flour is packaged and sold as family or all purpose flour at the retail level. Its ash content is .39% and its protein content is 12.30%.

In accordance with this invention all this patent flour was diverted by valve 17 of FIGURE 1 to the pneumatic system and thence to the sifter boxes 29, 30. The sifter frames in the boxes were covered with a sifting cloth known as 93 Nitex which has screen or sieve openings of 93 microns in diameter. The size separation was made in the sifter such that 40% of the parent flour fall in the coarse portion ("Overs" of the sifter cloth) and 60% of the flour fall in the fine portion (passed through the sifter cloth). The coarse or granular portion is treated for sale as a free flowing, instant blending, all purpose flour while the fine portion is treated for sale as a regular all purpose flour.

Typical chemical and physical analysis and baking results for the parent flour, the free flowing flour (Granular), and the fine all purpose flour (Fine) are presented in Table II.

TABLE II

| | Parent | Granular | Fine |
|---|---|---|---|
| Yield, percent | 100 | 40 | 60 |
| Ash, percent | .38 | .37 | .40 |
| Protein, percent | 12.4 | 12.3 | 12.4 |
| Bread Volume (cc.) | | | |
| Cake Volume (cc.) | 2,460 | 2,420 | 2,500 |
| Cup Weight (gms.) | 119 | 120 | 118 |
| Flowability (seconds) | (¹) | 14 | (¹) |
| Wettability (seconds) | (²) | 30 | (²) |
| Granulation, percent: | | | |
| Over U.S. Standard Sieve #100 | 0 | 0 | 0 |
| Over U.S. Standard Sieve #120 | 2.1 | 3.4 | 0 |
| Over U.S. Standard Sieve #140 | 20.0 | 35.2 | 0.2 |
| Over U.S. Standard Sieve #170 | 37.2 | 44.6 | 35.0 |
| Over U.S. Standard Sieve #200 | 7.7 | 10.4 | 12.0 |
| Thru U.S. Standard Sieve #200 | 32.1 | 5.9 | 52.1 |

¹ Does not flow.   ² Floats.

Example 1 shows the presence in the spring wheat flour of a sizable portion that is easily flowable, easily wettable, has good baking quality, is relatively dust free, the amount of material passing through the 200 wire sieve being taken as a measure of the dust present in the flour. Further as may be noted the granular flour and the fine flour have not been materially altered in their chemical content or baking quality. The granulation data shows that much of the dust of the parent flour resides in the fine portion and thereby leaves the coarse portion (granular) relatively dust free. Further the flowability and wettability data show that the granular flour is markedly different from either the parent flour or the fine portion in these respects. The granular flour flows more freely and wets more readily than does either of the parent flour or the fine flour portion.

EXAMPLE 2

The parent flour referred to in Table III is a winter wheat short patent flour made at the rate of 100 hundred weight per hr. Normally this parent flour is packaged and sold as family or all purpose flour at the retail level. Its ash content is .39% and its protein content is 9.8%.

In accordance with this invention the parent flour of Example 2 was diverted by valve 17 of FIGURE 1 to the pneumatic system and to the sifter boxes 29, 30. The sifter frames in these boxes were covered with a sifting cloth known as 93 Nitex. A size separation was effected in the sifter such that 30% of the parent flour fell in the coarse portion and 70% of the parent flour fell in the fine portion. The coarse or granular portion is treated for sale as a free flowing all purpose granular flour while the fine portion is treated for sale as regular all purpose flour.

Typical chemical and physical analysis and baking results for the parent flour, the free flowing flour (Granular), and the fine all purpose flour (Fine) are presented in Table III.

TABLE III

| | Parent | Granular | Fine |
|---|---|---|---|
| Yield, percent | 100 | 30 | 70 |
| Ash, percent | .38 | .37 | .41 |
| Protein, percent | 10.0 | 9.8 | 10.0 |
| Biscuit Specific Volume (cc.) | 2.63 | 2.61 | 2.57 |
| Cake Volume (cc.) | 2,460 | 2,380 | 2,470 |
| Cup Weight (gms) | 120 | 127 | 118 |
| Flowability Index (seconds) | (¹) | 13 | (¹) |
| Wettability Index (seconds) | (²) | 23 | (²) |
| Granulation, percent: | | | |
| Over U.S. Standard Sieve $100 | 0 | 0 | 0 |
| Over U.S. Standard Sieve $120 | 0.9 | 3.5 | 0 |
| Over U.S. Standard Sieve $140 | 15.6 | 32.9 | 1.9 |
| Over U.S. Standard Sieve $170 | 36.4 | 48.1 | 34.2 |
| Over U.S. Standard Sieve $200 | 14.4 | 10.8 | 12.0 |
| Thru U.S. Standard Sieve $200 | 42.4 | 2.8 | 51.2 |

¹ Does not flow.   ² Floats.

This example shows the presence in winter wheat flour of a sizable portion that is easily flowable, easily wettable, has good baking quality, and is relatively dust free. The granular flour and the fine flour have not been materially altered in their chemical content or baking quality. The granulation data shows that much of the dust of the parent flour now resides in the "fine" portion leaving the coarse or granular portion relatively dust free. The flowability and wettability data show that the granular flour is markedly different from either of the parent or the fine portion in these respects. The granular flour flows freely and wets readily in contrast to the other two flours which did not flow or wet.

EXAMPLE 3

As an example of the treatment of the granular flour of Example 2, the aforementioned granular flour is diverted to a blender and self rising ingredients, sodium bicarbonate, common salt, and monocalcium phosphate were added in the amount prescribed by a definition and standards for self-rising flour. Samples of the self-rising flour taken periodically during the period of production and biscuit baking test showed the flour to be of satisfactory biscuit baking quality. In Table IV several of the results are listed.

TABLE IV

| | Biscuit sp. vol. (cc./gm.) |
|---|---|
| Control | 2.63 |
| Self-Rising A | 2.63 |
| Self-Rising B | 2.61 |
| Self-Rising C | 2.57 |
| Self-Rising D | 2.54 |

Determinations of sodium bicarbonate made from samples taken during the course of the run gave values ranging from 1.23% to 1.32%. The theoretical or added value for sodium bicarbonate is 1.25%.

This example shows that it is possible to make a self-rising granular flour by adding a self-rising ingredient to the coarse (Granular) flour separated by sifting from normal (Parent) flour. The granular self-rising flour produced in a manner described is uniform and of good baking quality.

EXAMPLE 4

As an example of fractionating a parent flour by air classification, a parent flour consisting of short patent spring wheat flour was separated using a laboratory Alpine air classifier. The classification was a two step operation where the first coarse cut (50% of the total parent flour) was again classified to provide a freely flowable, easily wettable, relatively dust free granular flour of about 20% yield of the initial amount of parent flour. Physical, chemical and baking data listed below in Table V.

TABLE V

|  | Parent | Granular | 1st Fine | 2nd Fine |
|---|---|---|---|---|
| Yield, percent | 100 | 19.0 | 46.7 | 34.3 |
| Ash, percent | .38 | .32 | .43 | .34 |
| Protein, percent | 12.3 | 12.0 | 12.1 | 12.5 |
| Bread Volume (cc.) | 3,040 | 3,040 | 3,050 | 3,075 |
| Cake Volume (cc.) | 2,410 | 2,420 | 2,380 | 2,360 |
| Cup Weight (gms.) | 113 | 141 | 101 | 125 |
| Flowability Index (seconds) | (¹) | 15 | (¹) | (¹) |
| Wettability Index (seconds) | (²) | 42 | (²) | (²) |
| Granulation, percent: |  |  |  |  |
| Over U.S. Standard Sieve #100 | 0 | 0 | 0 | 0 |
| Over U.S. Standard Sieve #120 | 1.7 | 1.4 | 0 | 0.3 |
| Over U.S. Standard Sieve #140 | 13.9 | 14.4 | 2.3 | 5.5 |
| Over U.S. Standard Sieve #170 | 35.3 | 35.0 | 23.0 | 18.8 |
| Over U.S. Standard Sieve #200 | 9.2 | 20.0 | 9.1 | 18.6 |
| Thru U.S. Standard Sieve #200 | 39.1 | 28.5 | 65.0 | 55.9 |

¹ Does not flow. ² Floats.

This example shows that it is possible to produce by air classification a granular flour that has all the required characteristics of flowability, wettability and baking quality that are obtained in granular flours that are produced by sifting, it being noted that the cup weight in this run was about 10% higher than preferred.

EXAMPLE 5

In a roller milling process, the wheat endosperm particles are reduced to flour by a gradual reduction process. One of the intermediate endosperm stocks consisting of the material from the sizing sifter is called the "stone stock." The stone stock is a material from the sizing sifter that is to go to the 2 middlings roll and is only a portion of the total that goes to the 2 middlings roll.

The aforementioned stone stock was used as a parent material and separated into three fractions by sieving with frames clothed with 9xx and 13xx Swiss silk. The "overs" on the 9xx silk are referred to in Table VI as "Stone Stock Coarse," the "overs" on the 13xx Swiss silk being referred to as "Stone Stock Medium" and the "thrus" of the 13xx Swiss silk being referred to as "Stone Stock Fine." Typical analyses and baking results for the three fractions are listed in Table VI.

TABLE VI

|  | Stone Stock Coarse | Stone Stock Medium | Stone Stock Fine |
|---|---|---|---|
| Ash, percent | .37 | .38 | .41 |
| Protein, percent | 11.0 | 11.3 | 11.4 |
| Bread Volume (cc.) | 2,900 | 2,890 | 2,900 |
| Cup Weight (gms.) | 128 | 120 | 102 |
| Flowability Index (seconds) | 10 | 13 | (¹) |
| Wettability Index (seconds) | 16 | 32 | (²) |
| Granulation, percent: |  |  |  |
| Over U.S. Standard Sieve #100 | 57.0 | 2.1 | 0.8 |
| Over U.S. Standard Sieve #120 | 33.3 | 22.0 | 3.0 |
| Over U.S. Standard Sieve #140 | 5.9 | 41.0 | 6.0 |
| Over U.S. Standard Sieve #170 | 1.1 | 27.6 | 24.5 |
| Over U.S. Standard Sieve #200 | 0.6 | 4.4 | 21.3 |
| Thru U.S. Standard Sieve #200 | 1.6 | 2.5 | 44.0 |

¹ Does not flow. ² Floats.

This example shows that it is possible to separate a granular material from mill stocks that is readily flowable, easily wettable, and relatively dust free. The Stone Stock Coarse portion does not meet the definitions of the standards of identity for flour. The medium portion (Stone Stock Medium) is considered an acceptable granular flour in accordance with the teachings of this invention.

EXAMPLE 6

The parent flour referred to in Table VII was a spring wheat short patent flour made at the rate of 100 cwt./hr. Normally this parent flour is packaged and sold as family or all purpose flour at the retail level. Its ash content is .42% and its protein content is 12.6%. In accordance with this invention all this parent flour was diverted by valve 17 to the pneumatic system and thence to the sifter boxes at 29, 30. The sifter frames in the boxes 29, 30 were covered with sifting cloth known as 10xx Swiss silk. The size separation was made in the sifters 29, 30 such that 10% of the parent flour fell in the coarse portion and 90% of the parent flour fell in the fine portion. The coarse or granular portion is treated for sale as free flowing all purpose flour. The fine portion likewise can be treated for sale as regular all purpose flour.

Typical chemical and physical analysis and baking results for the parent flour, the free flowing flour (Granular), and the fine all purpose flour (Fine) are presented in Table VII.

TABLE VII

|  | Parent | Granular | Fine |
|---|---|---|---|
| Yield, percent | 100 | 10 | 90 |
| Ash, percent | .42 | .41 | .41 |
| Protein, percent | 12.6 | 12.4 | 12.6 |
| Bread Volume (cc.) | 3,115 | 3,175 | 3,200 |
| Cake Volume (cc.) | 2,400 | 2,380 | 2,450 |
| Cup Weight (gms.) | 125 | 127 | 124 |
| Flowability (sec.) | (¹) | 14 | (¹) |
| Wettability (sec.) | (²) | 44 | (²) |
| Granulation, percent: |  |  |  |
| Over U.S. Standard #100W | 0 | 0.2 | 0 |
| Over U.S. Standard #120W | 0.1 | 4.6 | 0 |
| Over U.S. Standard #140W | 14.5 | 71.4 | 9.4 |
| Over U.S. Standard #170W | 12.6 | 15.5 | 12.0 |
| Over U.S. Standard #200W | 25.0 | 6.7 | 31.5 |
| Thru U.S. Standard #200W | 45.2 | 0.9 | 47.1 |

¹ Does not flow. ² Floats.

EXAMPLE 7

In this run the same parent flour was used as in Example 6 and was classified in the same manner; however the size separation was made in the sifter clothed with a 15xx Swiss silk such that 50% of the parent flour falls in the coarse portion (Granular) and 50% of the parent flour falls in the fine portion (Fine). The coarse or granular portion is subject to treatment prior to being marketed as free flowing all purpose flour while the fine portion also is subject to treatment prior to being sold as regular all purpose flour.

Typical chemical and physical analysis and baking results of the parent flour, free flowing flour (Granular), and the fine all purpose flour (Fine) are presented in Table VIII.

TABLE VIII

|  | Parent | Granular | Fine |
|---|---|---|---|
| Yield, percent | 100 | 50 | 50 |
| Ash, percent | .42 | .39 | .45 |
| Protein, percent | 12.6 | 12.6 | 12.6 |
| Bread Volume (cc.) | 3,115 | 3,100 | 3,125 |
| Cake Volume (cc.) | 2,400 | 2,400 | 2,300 |
| Cup Weight (gms.) | 125 | 130 | 116 |
| Flowability (sec.) | (¹) | 20 | (¹) |
| Wettability (sec.) | (²) | 44 | (²) |
| Granulation, percent: |  |  |  |
| Over U.S. Standard #100 | 0 | 0 | 0 |
| Over U.S. Standard #120 | 3.2 | 1.4 | 0 |
| Over U.S. Standard #140 | 13.4 | 24.4 | 9.4 |
| Over U.S. Standard #170 | 11.2 | 20.4 | 12.0 |
| Over U.S. Standard #200 | 25.4 | 42.0 | 31.5 |
| Thru U.S. Standard #200 | 45.2 | 11.0 | 47.1 |

¹ Does not flow. ² Floats.

Examples 6 and 7 show the presence in spring winter wheat of a sizable portion that is easily flowable, easily wettable, has good baking quality, and is relatively dust free. The granular flour and fine flour of each of Examples 6 and 7 have not been materially altered in their chemical content or baking quality. The granulation data shows that much of the dust of the parent flour now resides in the fine portions and accordingly leaving the coarse (granular) portions substantially lower in dust content. The flowability and wettability data shows that the granular flour is markedly different from either of the parent or the fine portions in these respects. The granular flour flows more freely and wets more readily than do either of the fine or the original parent flour.

EXAMPLE 8

An all purpose flour milled by the Pillsbury Company was purchased in the retail market, the analysis of this flour being set forth under "Parent" in Table IX. This parent flour was separated into granular and fine portions by sifting using the gyro-sifter of an Allis Chalmers experimental mill that was clothed with Swiss silk bolting cloth. The parent flour was divided into two portions so that two different separations were made, an analysis of the first separation being indicated by "Granular A" and "Fine A" and the second separation being indicated by "Granular B" and "Fine B." In the first separation a yield of 20% granular flour was obtained using a 10xx Swiss silk; while for the second separation a yield of 40% granular flour was obtained using a 12xx Swiss silk. The yields were made by arbitrarily stopping the sifting when the desired amount of flour had passed through the cloth, the "overs" for each run being referred to as "Granular A" and "Granular B" respectively.

Typical chemical and physical analysis and baking results for the parent flour, the granular flours, and the fine all purpose flours are presented in Table IX.

TABLE IX

| | Parent | Granular A | Fine A | Granular B | Fine B |
|---|---|---|---|---|---|
| Yield, percent | 100 | 20 | 80 | 40 | 60 |
| Ash, percent | .37 | .36 | .37 | .37 | .37 |
| Protein, percent | 12.5 | 11.9 | 12.8 | 12.2 | 12.8 |
| Bread Volume (cc.) | 3,125 | 3,025 | 3,100 | 2,990 | 3,125 |
| Cake Volume (cc.) | 2,360 | 2,380 | 2,500 | 2,430 | 2,560 |
| Cup Weight (gms.) | 131 | 131 | 126 | 130 | 128 |
| Flowability (sec.) | (1) | 15 | (1) | 19 | (1) |
| Wettability (sec.) | (2) | 23 | (2) | 28 | (2) |
| Granulation, percent: | | | | | |
| Over U.S. Standard #100 | 0.1 | 0.3 | | 0.1 | 0 |
| Over U.S. Standard #120 | 4.8 | 28.3 | | 14.9 | 0.4 |
| Over U.S. Standard #140 | 15.2 | 46.8 | 8.3 | 32.1 | 1.4 |
| Over U.S. Standard #170 | 13.2 | 13.4 | 12.2 | 28.8 | 22.3 |
| Over U.S. Standard #200 | 27.2 | 8.7 | 31.2 | 15.7 | 37.7 |
| Thru U.S. Standard #200 | 39.1 | 2.0 | 47.7 | 7.9 | 37.0 |

[1] Does not flow. [2] Floats.

This example demonstrates that a granular flour fraction is present in flours milled by milling methods normally employed by milling firms other than the assignee of this invention.

To be noted is that each of the portions of the parent flour have an ash and protein content and baking performances that are very nearly the same as that of the parent flour.

Various tests of the various samples referred to above were tested in accordance with the following:

Granulation (sifting) test

In order to obtain the granulation data, 100 grams were sifted for five minutes on a Rotap sifter with a knocker using the following U.S. Standard Sieves: Nos. 100, 120, 140, 170, and 200. The "overs" on all sieves, and the "thrus" of the 200 sieve were recorded.

Wettability index test

In conducting a wettability test to determine the wetting time of the various samples, there is utilized a Plexiglas vibrating platform 50 (8" x 11" x 1½") equipped with a Syntron Vibrator Model V-4 and controller 51; a 250 ml. beaker 52, a 10 mesh wire screen 53 (6" x 6") fitted to the top of beaker 52, a powder funnel 54 (100 mm. diameter, 18 mm. stem diameter) G. T. Walker Co., Minneapolis, Minn., Catalog #36–871 or equivalent, a 250 ml. graduate, ring stand rod and funnel holder 55, and cork stopper. The aforementioned items which are designated are utilized as shown in FIGURE 2 and as described hereinafter. The beaker 52 containing 150 ml. distilled water is placed in the beaker holder 56 on the vibrating platform 50 to form a snug fit therewith. The 10 mesh wire screen is loosely fitted on the beaker so as to allow it to vibrate since otherwise flour may hang on the screen. Now the control is set at the calibrated marking and the vibrator turned on. Next a sample of flour, weight of 5.0 gm. plus or minus 0.1 gm., is poured into the stopped funnel which has been clamped on the ring stem rod such that the tip of the funnel is 1½ inches from the screen. Now the cork stopper is removed from the stem of the funnel and the wetting time is measured from the time of removal of the stopper until the flour sample is completely submerged in water. The wetting time is recorded in seconds and reported as the wettability index. Duplicate test samples should check within plus or minus 7 seconds; and the water should be changed for each test.

Flowability index test

In conducting the flowability tests there is used a Plexiglas vibrating platform equipped with a Syntron Vibrator and a powder funnel each of which is the same as used for the wettability tests. Also there is used a Vollrath stainless steel funnel (5 inch diameter, height 5½ inches, 13 oz. capacity) Aloe Catalogue No. E1723 or equivalent having the stem length of the funnel shortened to a total length of ⅞-inch and the diameter of the stem being ⅝-inch, a cork stopper, and a sample container of sufficient size to hold 300 gms. of flour. In conducting the flowability test, the cork stopper is placed in the bottom of the stainless funnel to penetrate only sufficiently to prevent loss of product. This stoppered funnel is suspended on a funnel holder on a ring stand which is mounted on the vibrating platform, the stoppered stainless steel funnel on the funnel holder being above the sample container to leave sufficient room for the removal of the stopper. The powder funnel is suspended from a second funnel holder on the ring stand such that the bottom of the stem of the powder funnel is one and one half inches above the top of the stainless steel funnel. The stainless steel funnel is filled with a 250 gram sample by pouring the sample through the powder funnel. The sample should be poured at such a rate that tapping of the ring stand or funnel is not required for a satisfactory flow. Now the controller is set at a calibrated marking and the vibrator is turned on. The stopper is removed immediately from the stem of the stainless steel funnel and the flow time is measured from the time of the removal of the stopper until the sample has completely flowed from the funnel. This flow time is recorded in seconds as a measure of the flowability.

Cup weight

A powder funnel, which is the same as for the Flowability Test, is mounted by a ring and a ring stand 2½ inches above the top lip of a standard dry measuring cup of 236.4 ml. capacity. The funnel is plugged with a rubber stopper attached to a short brass rod so that the stopper can be removed without unduly disturbing the flour. The funnel is filled with about 150 grams of the flour to be measured, the stopper removed, and the cup allowed to fill. The excess flour in the cup is struck off with a straight edge and the weight of the flour then in the cup determined to give the bulk density by this method.

As many widely apparently different embodiments of this invention may be made without departing from the spirit and scope thereof, it is to be understood that we do not limit ourselves to the specific embodiments herein.

What we claim is:

1. The method of preparing a free flowing flour from a patent wheat flour such that substantially all of which will pass through a No. 70 U.S. Standard Sieve, comprising classifying said patent wheat flour to separate out 10–50% thereof as a coarse fraction having a wettability index of a maximum of 90 seconds and a flowability index of less than 60 seconds, and a fine fraction, said coarse fraction being utilizable as a free flowing all purpose granular flour.

2. The method of claim 1 further characterized in that said classifying step comprises sifting said parent flour with a sifting cloth having openings in the range of 86–130 microns in diameter and that the sifting step is continued until 90% to 50% of said parent flour passes through the sifting cloth, the overs then remaining on said sifting cloth constituting said granular flour.

3. The method of making a free flowing flour comprising reducing wheat endosperm particles by a gradual reduction process to an initial flour such that substantially all of which will pass through a No. 100 U.S. Standard Sieve, said initial flour having a given chemical content and baking performance, classifying said initial flour to separate into 10–50% thereof as a granular portion of a wettability index of a maximum of less than 90 seconds, a flowability index of a maximum of less than 60 seconds, and a chemical content and a baking performance substantially the same as the said initial flour; and a fine portion of 90–50% of said initial flour; said granular portion being a free flowing flour.

4. The process of claim 3 further characterized in that the classifying step comprises sifting said initial flour through a sifting cloth having sieve openings in the size range of 86 to 130 microns, the overs on said cloth constituting said granular portion.

5. The process of claim 3 further characterized in that the classifying step comprises sifting said initial flour through a sifting cloth having sieve openings in the range of 86–93 microns until only the granular portion remains on said cloth and the granular portion has a wettability index of less than 40 seconds, a flowability index of less than 20 seconds and less than 17% by weight of particles that will pass through a No. 200 U.S. Standard Sieve.

6. The method of preparing a free flowing flour from a commercial non-agglomerated wheat flour having a given baking performance and chemical content, comprising sifting said wheat flour with a sifting cloth having openings in the range of 86 to 130 microns until about 90–50% of said wheat flour passes through said cloth and less than 17% by weight of the particles of wheat flour remaining on the cloth are less than a size to pass through a 200 mesh U.S. Standard Sieve to provide 10–50% of the wheat flour as a coarse fraction remaining as overs on the cloth and having a wettability index of less than a maximum of 90 seconds, a flowability index of less than a maximum of 60 seconds and a chemical content substantially the same as said wheat flour, and subjecting said coarse fraction to a conventional treatment of a standard flour to obtain a marketable free flowing, non-agglomerated flour.

References Cited

UNITED STATES PATENTS

| | | | |
|---|---|---|---|
| 2,941,730 | 6/1960 | Mertz et al. | 99—93 X |
| 2,957,632 | 10/1960 | Sullivan et al. | 99—93 X |
| 3,001,727 | 9/1961 | Block et al. | 99—93 X |
| 3,077,407 | 2/1963 | Rozsa et al. | 99—93 |
| 3,215,541 | 11/1965 | Borchordt et al. | 99—232 |
| 3,248,228 | 4/1966 | Gidlow et al. | 99—93 |

FOREIGN PATENTS 644,621  7/1962  Canada.

OTHER REFERENCES remaining on the cloth are less than a size to pass Food and Feed," 1959, pp. 324–326, The Avi Publishing Co., Inc.

Baker's Digest, February 1960, pp. 53 and 70.

RAYMOND N. JONES, *Primary Examiner.*

UNITED STATES PATENT OFFICE
CERTIFICATE OF CORRECTION

Patent No. 3,397,066　　　　　　　　　　　　　　　　August 13, 1968

Perrie D. Somers, Jr., et al.

It is certified that error appears in the above identified patent and that said Letters Patent are hereby corrected as shown below:

Column 5, line 69, "(granular))" should read -- (granular) --. Column 6, TABLE III, first column, lines 10 to 15 thereof, "Sieve $100", "Sieve $120", "Sieve $140", "Sieve $170", "Sieve $200", and "Sieve $200" should read -- Sieve #100 --, -- Sieve #120 --, -- Sieve #140 --, -- Sieve #170 --, --Sieve #200 --, and -- Sieve #200 --. Column 8, TABLE VIII, first column, line 11 thereof, "#200" should read -- #120 --. Column 12, line 13, cancel "flour".

Signed and sealed this 20th day of January 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents